Figure 1:
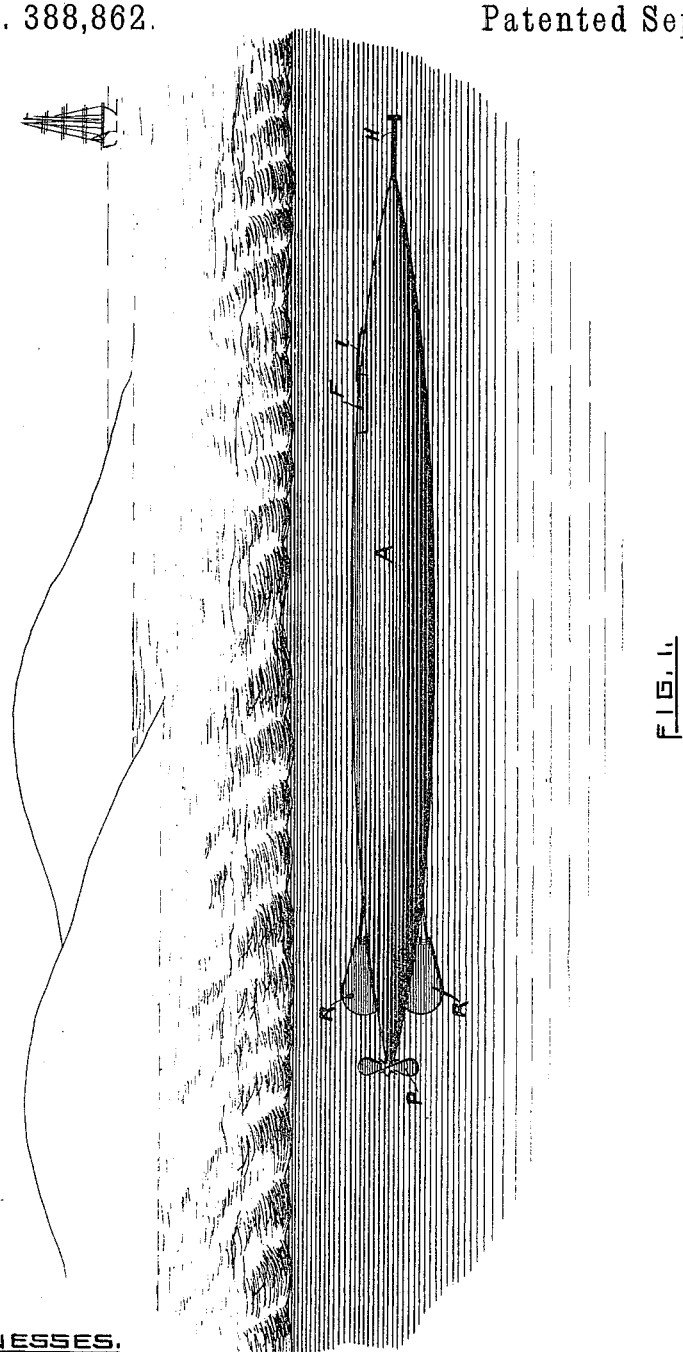

(No Model.)  5 Sheets—Sheet 1.

H. P. GRISWOLD.
SUBMARINE TORPEDO BOAT.

No. 388,862. Patented Sept. 4, 1888.

WITNESSES.
Charles Hannigan
Joseph Sanford

INVENTOR.
Horace P. Griswold
by Remington & Henthorn
Attys (No Model.) 5 Sheets—Sheet 2.
H. P. GRISWOLD.
SUBMARINE TORPEDO BOAT.
No. 388,862. Patented Sept. 4, 1888.
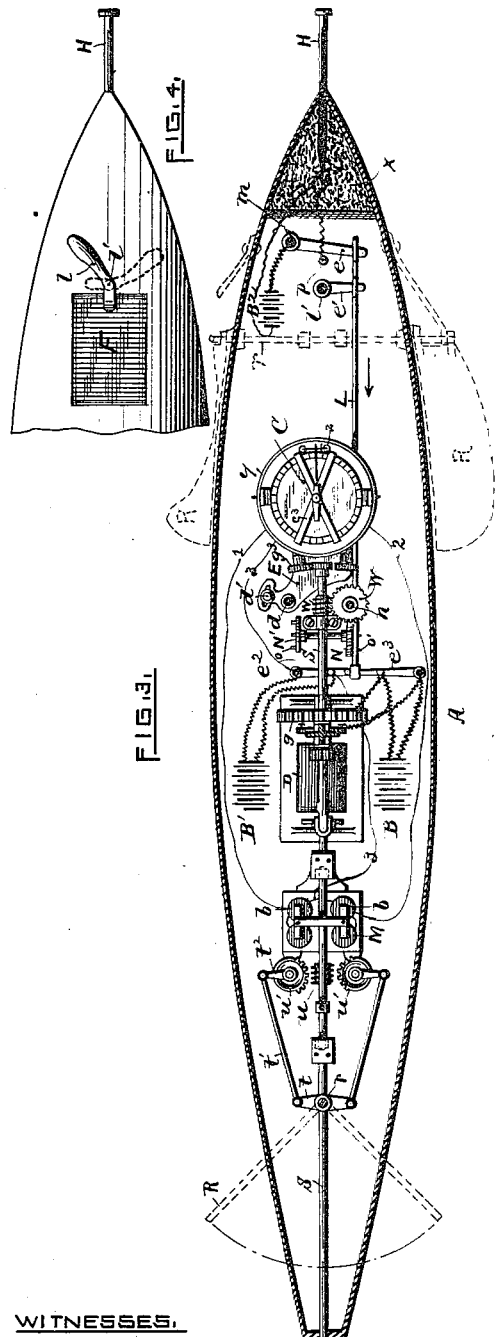
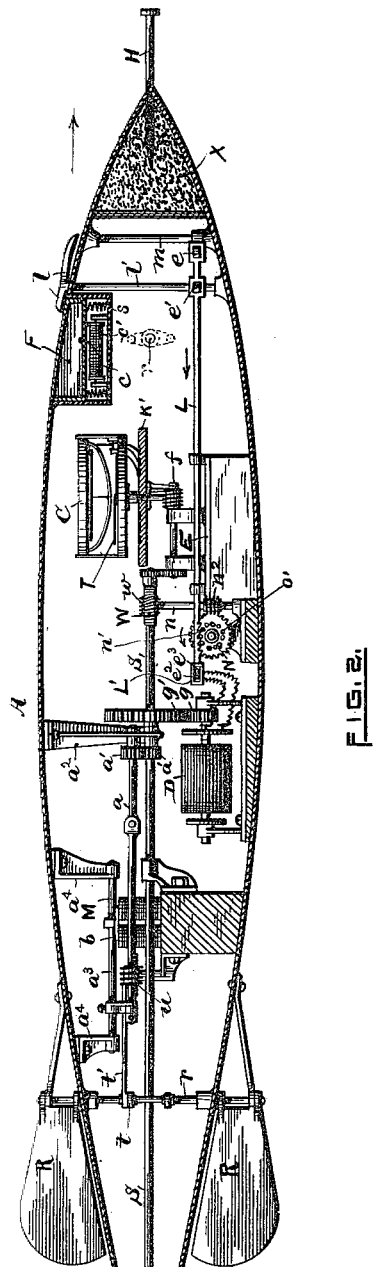
WITNESSES:
INVENTOR:
Horace P. Griswold

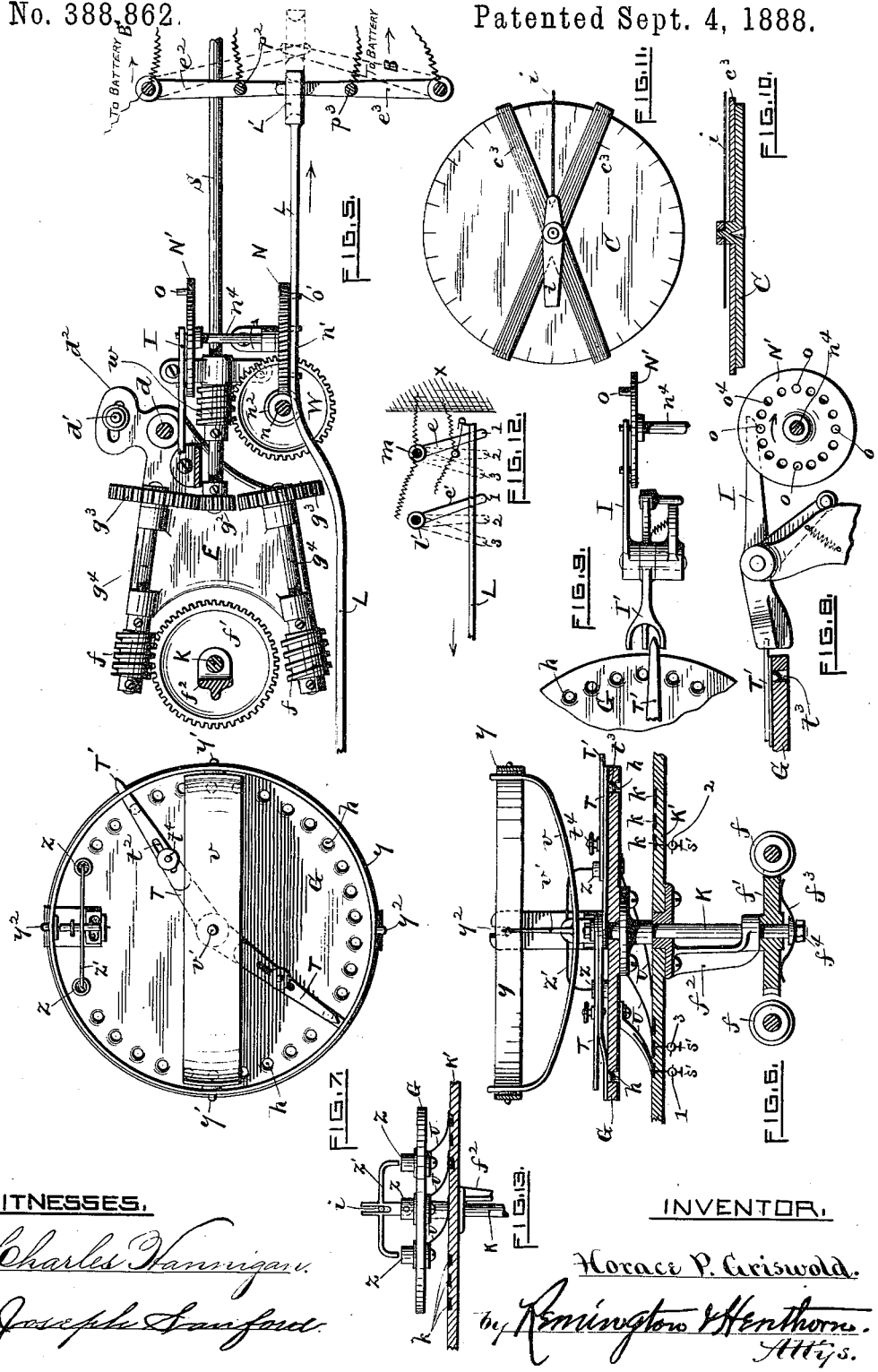

(No Model.) 5 Sheets—Sheet 4.

H. P. GRISWOLD.
SUBMARINE TORPEDO BOAT.

No. 388,862. Patented Sept. 4, 1888.

FIG. 14½.

WITNESSES
Charles Hannigan
Joseph Sanford

INVENTOR
Horace P. Griswold
by Remington & Henthorn
Attys.

(No Model.)

H. P. GRISWOLD.
SUBMARINE TORPEDO BOAT.

No. 388,862. Patented Sept. 4, 1888.

5 Sheets—Sheet 5.

WITNESSES.
Charles Hannigan
Joseph Sanford

INVENTOR.
Horace P. Griswold.
by Remington & Henthorn
Attys.

UNITED STATES PATENT OFFICE.

HORACE P. GRISWOLD, OF PROVIDENCE, RHODE ISLAND.

SUBMARINE TORPEDO-BOAT.

SPECIFICATION forming part of Letters Patent No. 388,862, dated September 4, 1888.

Application filed August 27, 1886. Serial No. 211,967. (No model.)

*To all whom it may concern:*

Be it known that I, HORACE P. GRISWOLD, a citizen of the United States, residing at Providence, in the county of Providence and State of Rhode Island, have invented certain new and useful Improvements in Submarine Torpedo-Boats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention herewith relates to certain novel improvements in submarine torpedo-boats, more particularly of the class operated and controlled through the agency of electricity, the whole being self-contained and independent of control from the shore or starting-station when in use, said invention being an improvement upon the devices shown and claimed in my United States patent, No. 333,008, of December 22, 1885.

My present invention consists in the combination, with an electrically-connected compass adapted to be automatically turned in either direction, of rudders actuated by mechanism controlled by means of said electrically-connected compass.

It also consists in the combination, with a compass electrically connected and mounted on a frictionally-driven spindle, of a pivoted frame carrying two sets of mechanism adapted to operate said spindle in either direction.

It also consists in the combination, with the main actuating or propelling mechanism, of one or more disk-wheels, each provided with a series of removable pins, and a suitably-mounted notched rod or connection adapted to engage said pins, whereby the rod in its movement automatically controls the several electric circuits.

It further consists in the combination, with the said notched rod and its actuating mechanism, of one or all of the following levers— viz., a lever adapted to open and close the electric circuit for steering, a lever adapted to open and close the main electric circuit for propelling the boat, a lever adapted to both open and close the electric circuit connected with the torpedo proper, and a lever for automatically releasing a float attached to the torpedo-boat.

It consists, finally, in the combination, with a self-contained and automatically-operating submarine torpedo-boat, of a float attached to and forming a part of the boat when in place, a reel secured to the boat, a line connecting said reel and float, and mechanism for automatically releasing the float, thereby permitting the latter to rise to the surface of the water for indicating the location of the submerged boat, all as will be more fully hereinafter set forth and claimed.

The object of the present invention is to provide a submarine torpedo-boat with means whereby it can be sent in any desired predetermined course or courses and to any desired distance, (within its limits,) the boat being wholly independent of control from the starting station, after being sent out on its course, until its return thereto unless it meets an obstruction.

I prefer, in case a vessel be the starting-station, that the torpedo-boat be provided with the concealed float, which only is automatically released just after the boat has passed over the greater portion of its prescribed course and prior to its arrival at or near the starting-station, the propelling mechanism at the same time being stopped by automatically switching off the electric current.

In order to illustrate my present improvements, I have prepared the accompanying five sheets of drawings, in which—

Figure 14:
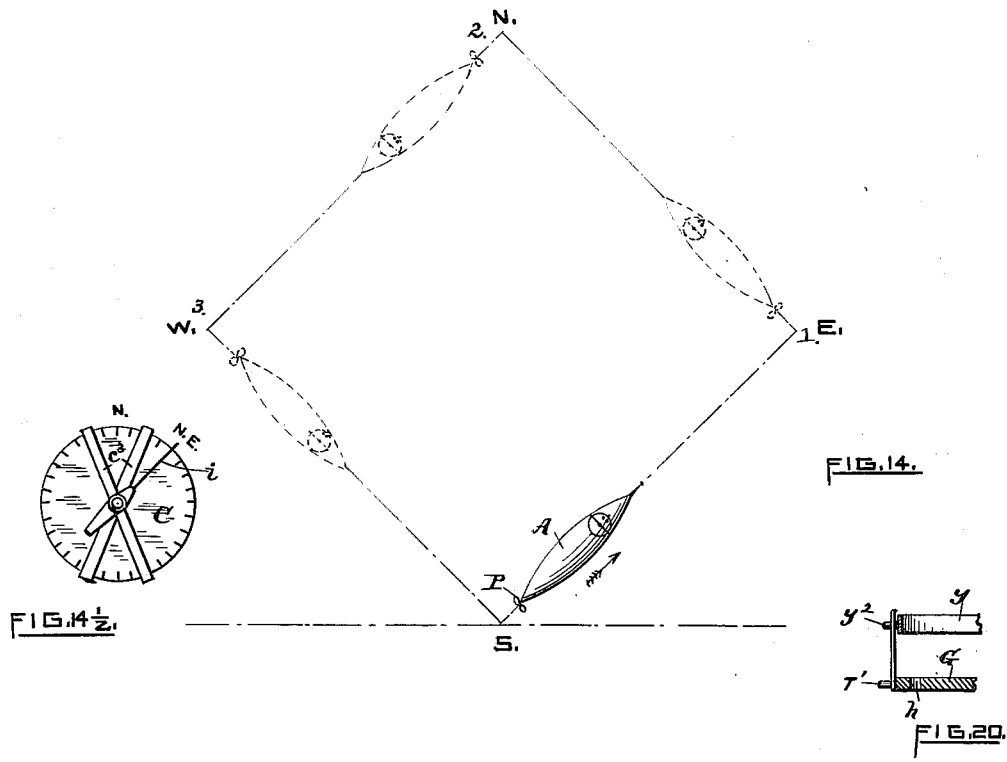
Figure 20:
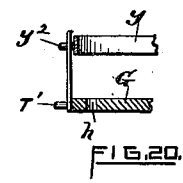
Figure 15:
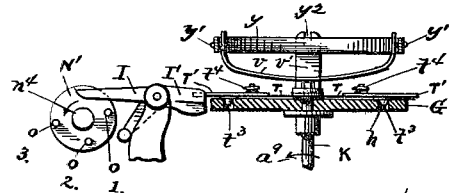
Figure 21:
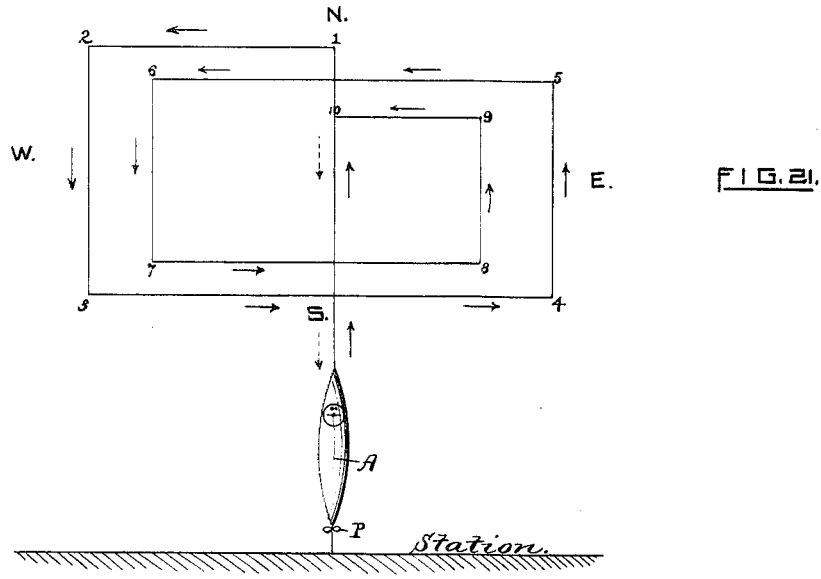
Figure 22:
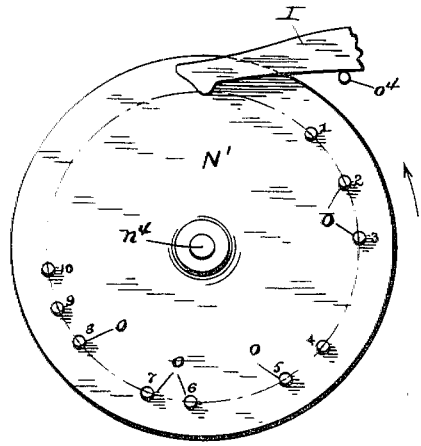

Figure 1, Sheet 1, represents a general perspective view of the torpedo-boat submerged in water as in use. Fig. 2, Sheet 2, is a longitudinal central sectional view of the boat, showing the general arrangement of the interior mechanism, &c. Fig. 3 is a horizontal sectional or plan view of the same, the outline of the boat being substantially the same as in the preceding figure—that is, cigar-shaped. Fig. 4 is a partial plan view of the forward portion of the boat, showing the arrangement of the float and its retaining lever or catch. Fig. 5, Sheet 3, is an enlarged plan view, in partial section, showing the mechanism for actuating the compass spindle in either direction, and also showing the pin wheels or disks and the main operating connection or notched rod. Fig. 6 is a vertical sectional view showing the compass-spindle and its attachments, together with the frictionally-mounted driving-gear therefor. Fig. 7 is a plan view of the compass-bearings or gimbal-joint and the adjustably-mounted fingers attached to the insulated disk, which is secured to the spindle. Fig. 8 is a detached view showing the releasing or escapement mechanism. Fig. 9 is a plan view of the same. Fig. 10 is a sectional view of the compass-card and needle, and also showing a light metallic finger, $i$, adjustably secured thereto. Fig. 11 is a plan view of the same, the compass-needle being represented as double. Fig. 12 is a detached view showing the lever or arm for electrically connecting the torpedo. Fig. 13 is a reduced view showing the arrangement of the mercury-cups and brushes for electrically connecting said cups with the stationary rings forming a part of the automatic steering apparatus. Fig. 14, Sheet 4, indicates a quadrangular course which the boat is adapted to automatically make, the compass and mechanism being of course previously adjusted to the prescribed angles and distance. Fig. 14½ is a detached view of the compass card. Fig. 15 is a side view, in partial section, showing the escapement-lever and pin-carrying disk arranged to produce said course, and also showing the insulated disk mounted on the compass-carrying spindle. Figs. 16, 17, 18, and 19 represent plan views of the disk, &c., corresponding, respectively, to the four sides of the course shown in said Fig. 14. Fig. 20 is a partial vertical sectional view of the disk, showing a pin adapted to engage the escapement-lever. Fig. 21, Sheet 5, is a diagram representing a rectangular course within which the boat makes a series of similar courses in a decreasing ratio and finally returning to the point from which it started. Fig. 22 is an enlarged front view of the continuously-revolving disk having the tripping-pins arranged therein to produce the angular turns represented in the preceding figure.

The following is a more detailed description of my invention.

A, referring to the drawings, designates the improved submarine torpedo-boat as a whole, its general outline being preferably cigar-shaped, the shell thereof being sheet metal. The form of the boat, however, may be modified as desired, as well as the general arrangement of the interior mechanism, although I prefer the order of the several parts as represented in the drawings.

To the rear of the boat is fitted, upon the main shaft S, the propeller P, as usual.

R R indicate upper and lower rudders mounted and arranged to give a lateral direction to the boat, the mechanism employed for the purpose in the present case being substantially the same as that described and claimed in my United States patent, No. 333,008, before referred to, the same consisting, essentially, of a jointed shaft, $a$, driven by the shaft S through gears $a'$ $a'$. To said shaft $a$, at its rear end, is secured the worm or screw $u$, which, by means of the jointed shaft, is adapted to engage the port and starboard segment-wheels $u'$ $u'$, the latter in turn being mounted on upright spindles, each having an arm, $t^2$, which transmits the angular movement of said wheels $u'$ to the arms $t$ of the rudder-shaft $r$ by means of links $t'$.

A short shaft, $a^3$, is mounted above the shaft $a$ in bearings $a^4$. To the former shaft, $a^3$, is secured the armature $b$ of the port and starboard electro-magnets M. It is obvious now that as a current of electricity flows through said magnets M right or left, so, also, will the vibration of the armature produce a corresponding movement to the after portion of the revolving shaft $a$, thereby engaging the worm $u$ with the respective wheel $u'$ and cause the rudders to move in a corresponding degree.

The means for running the boat may be an engine using compressed air, gas, &c., or any well-known motor may be used. In the drawings, however, I have indicated a battery, B, for the purpose, which by suitable connections transmits the current of electricity to a motor, D, the latter in turn transmitting its power to the main shaft S by means of gear-wheels $g$ $g'$, all as clearly shown in Figs. 2 and 3.

To the forward portion of the shaft S is secured a worm, $w$, which engages a wheel, W, secured to the upright shaft $n$, the latter having a worm, $n^2$, secured thereto, engaging a wheel, N, mounted upon the horizontal shaft $n^4$. Said wheel N is provided with a series of circularly-arranged holes adapted to receive pins $o'$.

To the forward end of the main shaft is secured a gear, $g^2$, Fig. 5, adapted to engage gear-wheels $g^3$, secured to shafts $g^4$, mounted in bearings attached to the frame E, the latter being pivoted at $d$ to the boat's frame.

$d^2$ is a slotted arm extending from the frame E, $d'$ being a binding screw for retaining the frame in position after being adjusted. Each shaft $g^4$ is provided with a worm, $f$, adapted to engage the worm-wheel $f'$, loosely mounted on the lower end of the compass-shaft K, the object of the pivoted frame E, &c., being to provide means whereby the compass-shaft may be revolved in either direction, as desired. The wheel $f'$ is frictionally secured to the shaft K by means of the spring $f^3$ and the adjusting-nut $f^4$. (See Fig. 6.)

The manner of mounting and electrically connecting the compass $c$ is substantially the same as claimed in said Patent No. 333,008, G being an insulated disk secured to and revolving with the shaft or spindle K and having mercury-cups $z$, adapted to receive the bent ends of the forked two-arm lever $z'$. (See Fig. 13.)

$v$ and $y$ indicate the gimbal-frame of the compass, $v'$ being the center pin on which the compass-card is mounted to freely revolve, as usual. The circular frame portion $y$ of the said frame is provided with oppositely-arranged pivots $y^2$, which rest in uprights secured to the disk G, (see Figs. 6, 7, 20, &c.,) the upwardly-bent or transverse portion of the frame, as $v$, which directly supports the compass-card C, being in turn pivoted to the ring $y$ at $y'$. (See Figs. 6, 7, and 15.)

To the top of the compass-card is an adjustably-secured finger, $i$, adapted to engage the forked portion of the two-arm lever $z'$.

In the drawings (see Fig. 11, &c.) I have represented the compass needle $c^3$ as duplex or double. Such needle I believe possesses greater magnetic power as well as serving to keep the compass more "steady."

K' indicates a stationary frame or tie for supporting the compass-spindle K, &c. To the face of the frame K' are secured three concentrically-arranged metallic rings, $k$, said rings being electrically connected with the steering-battery B' and the electro-magnets M, by means of the posts and binding-screws $s'$, and the attached conducting-wires 1 2 3, three brushes, U, in turn connecting the mercury-cups $z$ and the rings $k$. (See Fig. 13.)

Figures 16, 17, 18, 19:
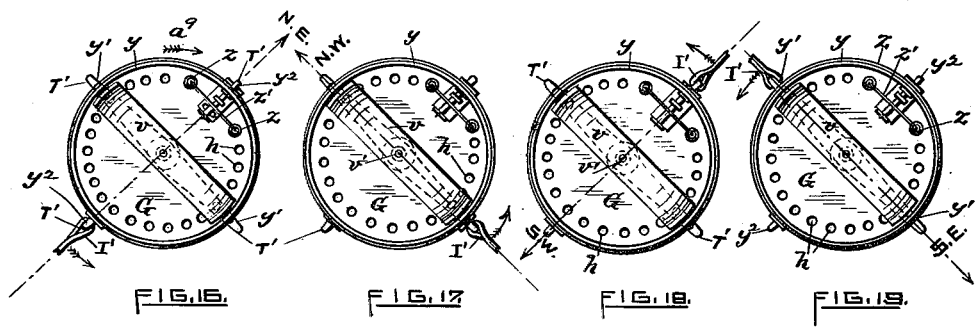

T indicates one or more fingers adjustably secured to the top of the insulated disk G, said fingers consisting each of two pieces, the outer portion being slotted at $t^2$ and adjustably secured to the inner or central piece by means of the screw and nut $t^4$. The under portion of the finger T is provided with a projection or lug, $t^3$, adapted to engage a series of holes, $h$, formed in the disk G, near its outer edge, as clearly shown in Figs. 6 and 7. The outer end of the finger T is adapted to project beyond the rim of the disk G, as at T', for the purpose of engaging the escapement-lever, about to be described. I prefer, as shown in Figs. 16, 20, &c., to have a projecting-pin, T', permanently secured to the disk and in line with the pivot-pins $y^2$.

N' designates a disk secured to the end of the shaft $n^4$ and operated by means of the worm $n^2$, (see Fig. 2,) said disk having a series of holes, $o^4$, formed in its face, into which pins $o$ are inserted, Figs. 8, 9. The forked end I' of a suitably-mounted escapement-lever, I, is adapted to intermittently engage said pins, thereby permitting the compass to be axially revolved from one projecting arm or finger T' to the succeeding one, as desired. The intermittent action of the escapement-lever I is effected by means of the slowly-revolving pin-carrying disk N', pins $o$ being mounted therein at intervals corresponding to the relative distances and number of deviations or deflections from the first run in the course, as desired—that is to say, at the instant the pin $o$ leaves the lever I the latter is immediately depressed by means of a spring, thereby elevating the opposite end, I', of the lever, which movement releases an arm, T, and permits the frictionally-driven disk G (and compass) to revolve until stopped by the engagement of the next arm, T, with the lever. By means of this arrangement the boat is adapted to be turned in its course at any angle corresponding to the relative position of the several fingers T.

Another feature of the present invention resides in the addition of a float and the novel device for releasing the same. F designates the float proper, fitted into and partially filling a cavity formed in the upper side of the forward end of the boat. A spool, $c'$, is mounted in said cavity immediately below the float, a light wire or cord, $c$, being wound thereon and attached to the float, as indicated in Fig. 2.

The float is retained in place by means of the catch-lever, $l$, secured to the upper end of a vertical shaft, $l'$, projecting through the boat, as clearly shown. To the lower portion of said shaft is secured a lever, $e'$, connected with mechanism about to be described.

$B^2$ indicates a battery located in the forward portion of the boat for firing the torpedo $x$, $m$ being a vertical rod having a lever, $e$, secured thereto. Said lever $e$, when in contact with the pin $p$, produces a closed electric circuit, during which time the torpedo may be exploded by means of the firing-pin H.

Referring now to the mechanism for operating the levers $e'$ $e$, I have shown in Figs. 2, 3, 5, and 12 of the drawings a long rod or connection, L, mounted in bearings, said rod having two eyes formed in its forward end to receive and actuate the free end of said levers $e$ $e'$. The after portion of the rod L is provided on its under side with a series of notches, $n'$, adapted to engage the pins $o'$ of the disk-wheel N. The extreme rear end of the rod L has the enlarged and elongated eye L' formed therein, Fig. 5, &c., in which are mounted the free ends of the switch-levers $e^2$ $e^3$ of the steering and propelling batteries B' B, respectively. It is evident, now, that the rod L as connected is adapted to automatically control the electric currents flowing from the three batteries $B^2$ B' B to their respective devices, said rod at the same time being further adapted to release the float F.

I have indicated in the forward portion of the boat by dotted lines R $r$ an auxiliary set of rudders, which are located transversely of the boat, said auxiliary rudders being adapted to be operated by means of electro-magnets and connections, substantially as represented, in the after portion of the boat.

The desired submersion of the boat may be effected by ballast or hydrostatic pressure, as desired. I make no claim herewith, however, to means for producing this result.

The operation of my improved torpedo-boat may be described as follows: The course or direction in which the boat is to run is first decided upon and the pins $o$ arranged in the disk-wheel N' correspondingly, the requisite number of fingers T being also arranged upon and extending beyond the rim of the insulated disk G of the compass spindle, and, finally, the frame E is adjusted so as to bring one of the screws $f$ into engagement with the worm-wheel $f'$ to revolve the compass to the right or left, as predetermined. The compass-connections having thus been made, I next insert a series of, say three, pins, o', (see Fig. 2,) into the wheel N, which latter in its revolution causes said pins to successively engage with the notches n' of the rod-connection L, (the arrangement of said pins o' with relation to the distance and course just described being such that the first pin of the series engages the rod L just before the completion of the boat's course and while in the vicinity of the enemy.) Finally, the float F is placed in position, the rod L meanwhile being in the extreme left or aft position, the two levers e' e being in the dotted-line position 3, Fig. 12, and the handle or catch-lever l then being as represented by the dotted lines in Fig. 4. Everything being ready, the mechanism is set in motion by the operator by simply swinging the lever l into position to lock the float, which movement forces the rod L to the extreme right, or forward, corresponding to 1 1, Fig. 12, the two switch-levers $e^3$ $e^2$ then forming a closed electric circuit by means of their contact with the pins $p^3$ $p^2$ of the batteries B B', respectively. The boat now leaves the station (having nothing in sight to indicate its course) and enters upon its prearranged course, the compass being reversed or turned axially, according as the several pins o successively engage the escapement-lever I, Figs. 8, 9, to intermittently release the disk G, as hereinbefore described. At the proper time the shaft $n^4$ in its revolution causes a pin, o', to engage a notch of the rod L, thereby forcing the latter rearwardly (see arrow direction) until the levers e e' assume the position shown at 2 in Fig. 12, the lever e then resting on the pin p and producing a closed electric circuit. While in this position, should the firing-pin H meet an obstruction and be forced rearwardly against the wires of the battery $B^2$, an electrical explosion of the torpedo would immediately follow, the lever l, however, still retaining the float in position.

It will be observed that the switch-levers $e^2$ $e^3$ have thus far remained stationary, the slotted end L' of the rod permitting the latter to move longitudinally without affecting the position of said levers. Now, in case no obstruction has been encountered the boat near the end of its return course is rendered safe by means of another pin, o', engaging the rod L and moving the latter still farther rearwardly, the two levers e e' being then in the position 3, Fig. 12, the lever e, by reason of this latter movement, being disengaged from the pin p, thereby opening the electric circuit and rendering the torpedo safe or harmless for the time being. At the same time the lever l releases the float. The latter now rises to the surface of the water, aided somewhat by the reaction of the springs s, (see Fig. 2.) the float being still attached to the boat by means of the connection c. Soon after this a final movement of the mechanism carries the rod L to its extreme rearward position, thereby forcing the two switch-levers $e^2$ $e^3$ from the pins $p^2$ $p^3$ (see dotted lines, Fig. 5) and shutting off the electric current from their respective batteries B. The boat now stops running, and may be secured and set out again after readjustment.

It is obvious that the surface float F serves to accurately locate the position of the submerged boat upon its return.

The following briefly describes the manner of electrically connecting the compass with the steering mechanism. By means of the metallic rings k, before referred to, an electric connection with the electro-magnets M is adapted to be made at any point in the revolution of the compass whenever an end of the lever z' dips into its corresponding mercury-cup z. The center mercury-cup, z, and center ring, k, being always in electrical contact with the steering-battery B' and electro-magnets M by means of the center conducting line-wire, 3, the side line-wires, 1 and 2, serving to electrically connect the outer and inner metallic rings, k k, with the port and starboard electro-magnets M, respectively. (See Figs. 3 and 6.)

In Fig. 14, Sheet 4, of the drawings, I have represented the boat as just starting out on a quadrangular course, the first part of the run being in a north-easterly direction, the corresponding position of the compass being shown in Figs. 14½, 15, and 16, each side or "leg" of the course being, say, five hundred yards, the angular distance between the pins o, Fig. 15, representing or corresponding to a like number of yards, (the said angular distance being determined by the known or assumed speed of the boat, together with the reducing train or gearing.) In the course selected, Fig. 14, the four fingers T' are set ninety degrees apart. It will be seen now that as the disk N' slowly revolves (the boat being started on its course, the first pin, o', will engage the free end I of escapement-lever just prior to the end of the the first run, thereby releasing a finger T' and permitting the spindle K, with the attached compass, to revolve in the arrow direction toward the right (see $a^0$, Fig. 16) until the next finger engages the lever. At the instant of making the change the compass finger i will, owing to the persistency of the magnetic needle to point due north, cause an arm of the forked lever z' to dip into its corresponding mercury-cup z, thereby exciting the electro-magnets M and producing an electric circuit, which acts upon the steering mechanism to actuate the rudder or rudders, which in turn cause the boat to be deflected to the left at the angle 1. As the boat becomes steady in its north-westerly run, the compass-needle will again point due north, thereby at the same time withdrawing the arm of the lever z' from the mercury. Fig. 17 shows the relative position of the disk G or compass to the fore-and-aft axis of the boat. At the point or angle 2 the second pin, $o^2$, engages the lever I, as before described with reference to the first pin, thereby releasing a finger T' and permitting the compass to revolve ninety degrees. The magnetic action of the compass-needle, as before, tips the forked lever z' and sets the steering mechanism in operation. As the boat becomes steady in the south-westerly run, the lever $z'$ will be withdrawn from the mercury through the medium of the compass-needle and finger $i$, the relative position being shown in Fig. 18. Finally, at the angle 3 the pin $o^3$ releases the lever I. The boat then automatically turns, as described with reference to the first and second angles, and enters upon its south-easterly run or tack, Fig. 19 representing the corresponding position of the compass and axis of the boat. Just prior to the end of the run the float is automatically released and the electric current switched off from the operating-batteries through the medium of the rod L, &c., hereinbefore described.

Of course, during the run just described, if the boat encounters an obstruction or enemy the torpedo $x$ is automatically exploded, thereby inflicting serious damage upon the enemy, as well as destroying itself.

The diagram shown in Fig. 21 represents an enlarged rectangular course combined with similar courses covering a smaller area, the courses as drawn necessitating ten angular turns of the boat, each deflection being ninety degrees. The disk N' (shown in Fig. 22) indicates an arrangement of pins $o$ adapted to produce the course prescribed, the numeral designating each pin corresponding to the release of the escapement-lever I at the correspondingly-numbered angle in the course. Fig. 11 represents the corresponding position of the compass-finger $i$.

It is evident that by substituting a disk having a greater number of pins $o$, and at the same time providing the disk G with a corresponding number of fingers T', the boat will describe a substantially-circular course.

It is further evident that a great number of geometrical courses may be accomplished by the boat by simply making different combinations of the pins $o$ and the projecting fingers T'.

It is not necessary that the compass-finger $i$, Figs. 10, 11, be always set so as to point due north, as the said finger may be adjustably secured to the card C in any desired position corresponding to the course selected. It is desirable, however, that the mercury-cups stand on the forward side of the spindle K when the boat first starts out on its prescribed course. It will be observed that after the boat has turned or changed its direction, as at 1 2 3, &c., Fig. 14, the mercury-cups, &c., still point as in the original or first northeast portion of the course. (See also Figs. 16, 17, 18, and 19.

I would explain here that if the first run in a course selected is to be due north, or practically so, then the compass-finger $i$ will obviously be adjusted so as to point north, as shown in Fig. 11.

The action of the compass and boat may be briefly stated, as follows: At the instant of releasing the compass through the medium of a pin, $o$, and the escapement-lever, the spindle K, &c., immediately revolve until stopped by the engagement of the escapement-lever with the next finger T', the boat in response to the electrically-connected helm turning in its course until arrested by the steady position of the compass-needle; or, in other words, the boat in making a circumscribed course is intermittently revolved round the compass.

Having thus described my invention, what I claim as new, and desire to secure by United States Letters Patent, is—

1. The device for automatically maneuvering boats, the same consisting of a compass mounted to revolve, mechanism for intermittently operating the same, a disk connected therewith having adjustably-mounted stops or pins, a steering mechanism adapted to electrically control the rudder, means for electrically transmitting the vibrations of the compass needle therefrom to the steering mechanism, and means for propelling the boat, whereby it is possible to send the boat out from a station on a predetermined course or courses and to return the boat thereunto, substantially as hereinbefore described.

2. An automatically-operating boat having mechanism for intermittently revolving the compass, mechanism for steering, electrically controlled by said compass, and means for propelling the boat and actuating the steering and compass mechanisms, whereby the boat is adapted to be automatically turned in its course by the combined action of the said steering and compass mechanisms, which are preadjusted to intermittently revolve the compass corresponding to the number of angular turns and distances which the boat is to make.

3. An automatically-operating torpedo-boat having a compass and insulating disk, mechanism for intermittently revolving the same, substantially as hereinbefore described, a mechanically-operating steering apparatus, a device for electrically controlling the same, and a finger, as $i$, adjustably secured to the compass-card and forming a part of the said steerer-controlling device, substantially as described, and for the purpose specified.

4. An automatically-operating boat having mechanism for releasing the compass at fixed intervals, mechanism for axially turning the compass, and a steering device electrically connected with and controlled by said compass, whereby the angular movement of the latter, after being released, (as from one stop to the next,) vibrates the rudder or rudders through the medium of said electrically-connected steering mechanism, thereby causing the boat to be deflected from its straight course an angular distance substantially equal to that of the preceding movement of the compass, as hereinbefore specified.

5. A boat having its compass provided with an adjustably-secured finger, as $i$, a disk, as G, carrying the compass and having mercury-cups, a lever adapted to engage said cups and engaging the compass-finger, adjustably-mounted fingers or pins, metallic brushes, as U, connected with the mercury-cups, mechanism for automatically releasing and intermittently revolving the disk, a ring, as $k$, for each brush, mechanism for operating the rudder, electro-magnets having the armatures thereof adapted to control the rudder-operating mechanism, a battery or other source of electricity, and conducting-wires connecting said rings $k$, armatures and battery, whereby a lateral deflection of the magnetic needle to the right or left closes an electric circuit, whereby a current is transmitted from the corresponding mercury-cup, brush, and ring to the said electro-magnets, for the purpose hereinbefore set forth.

6. The combination, with the electrically-connected compass of a submarine torpedo-boat and means for intermittently operating the same, of a pivoted frame, means for adjustably retaining the frame in position, and two shafts mounted in said frame, each carrying a gear and worm, whereby the compass is adapted to axially revolve in either direction, as hereinbefore set forth.

7. In a submarine torpedo-boat propelled and steered by electricity, the combination, with the compass and mechanism for intermittently revolving the same, of mercury-cups secured to an insulated disk carrying the compass, a forked two-arm lever adapted to engage said cups, and line-wires for electrically connecting the mercury-cups and the electro-magnets of the steering apparatus, substantially as described, and for the purpose hereinbefore set forth.

8. In a submarine torpedo boat, the combination, with the compass provided with the adjustably-secured finger $i$, of a frictionally-driven spindle, K, an insulated disk secured to said spindle, carrying the compass, mercury-cups $z$, and a forked two-arm lever mounted on said disk, mechanism for intermittently revolving the spindle K, and metallic conductors or line-wires electrically connecting said mercury-cups with the steering mechanism, substantially as shown and set forth.

9. The combination, with the mounted compass-carrying insulated disk G, provided with electrically-connected mercury-cups $z$, and a series of holes, $h$, of the adjustably-mounted stops or fingers T, and mechanism, substantially as shown and described, for automatically and intermittently operating said disk G, for the purposes hereinbefore set forth.

10. The combination, with the compass carrying disk G, the three mercury-cups $z$, secured thereto, and a brush, U, connecting with each cup, of a series of suitably-mounted concentrically-arranged electrically-connected metallic rings, $k$, whereby each of said cups $z$ is adapted to be electrically connected with its respective ring at any point in the revolution of the disk G, as hereinbefore set forth.

11. In a submarine torpedo boat, the combination, with the mounted notched rod or connection L and means for intermittently actuating the same, of suitably mounted and connected levers $e$ $c^2$ $e^3$ and float-operating lever $e'$, all having their free ends mounted in said rod $l$, substantially as shown, and for the purpose hereinbefore set forth.

12. The combination, with the notched connecting-rod L, having switch-levers $e$ $c^2$ $e^3$ and float-retaining lever $e'$, mounted in and operating by said rod L, of the driven wheel N, and pins $o'$, inserted into said wheel for engaging the notched portion of the rod L, substantially as shown, and for the purposes hereinbefore set forth.

13. In a submarine torpedo boat, the combination, with a float attached to the boat by a flexible connection and a catch for retaining said float in position, of mechanism, substantially as hereinbefore described, for automatically releasing the float, for the purpose set forth.

14. The combination, with a torpedo-boat having a pocket formed in its shell, of a float fitted into said pocket, a flexible tie connecting the float and boat, and mechanism for automatically releasing the float from the pocket, substantially as shown, and for the purpose hereinbefore set forth.

15. The submarine torpedo-boat A, hereinbefore described, having the propeller P and its engine or driving mechanism, rudders R, the electrically-connected compass C and mechanism for automatically and intermittently revolving the same, the torpedo $x$ and automatically-operating mechanism for electrically connecting and disconnecting the same, a float, F, and mechanism for automatically releasing it, and a steering device comprising electro-magnets M, armature $b$, jointed shaft $a$, having the worm $u$ secured thereto, two segment-gears, $u'$, links $t'$, &c., for transmitting the angular movement of said gears to the rudders R, and wires for electrically connecting the compass C and electro-magnets M, the whole constructed, arranged, and operating substantially as shown and hereinbefore set forth.

16. In a torpedo-boat, the combination, with the card of a suitably-mounted compass, of the double or duplex magnetic needle $c^3$, secured to said card, substantially as shown, and for the purpose set forth.

17. The improvement in the manner of automatically operating submarine torpedo-boats, the same embodying the following-named devices, viz: a compass adapted to be intermittently revolved in either direction, an electro-magnetic steering mechanism electrically connected with said compass, a torpedo adapted to be electrically exploded, a float, and a rod or connections adapted, by means of levers, &c., to successively close and open the electric circuit of the torpedo, to release the float, and to stop the steering and propelling mechanism, substantially as hereinbefore described.

In testimony whereof I have affixed my signature in presence of two witnesses.

HORACE P. GRISWOLD.

Witnesses:
WM. R. DUTEMPLE,
JOSEPH SANFORD.